United States Patent
Nakanishi

(10) Patent No.: US 9,244,306 B2
(45) Date of Patent: Jan. 26, 2016

(54) COLOR FILTER SUBSTRATE, DISPLAY PANEL AND METHOD FOR PRODUCING COLOR FILTER SUBSTRATE

(71) Applicant: UNIFIED INNOVATIVE TECHNOLOGY, LLC, Wilmington, DE (US)

(72) Inventor: Isao Nakanishi, Osaka (JP)

(73) Assignee: UNIFIED INNOVATIVE TECHNOLOGY, LLC, Wilmington, DE (US)

( * ) Notice: Subject to any disclaimer, the term of this patent is extended or adjusted under 35 U.S.C. 154(b) by 0 days.

(21) Appl. No.: 14/504,249

(22) Filed: Oct. 1, 2014

(65) Prior Publication Data

US 2015/0015837 A1    Jan. 15, 2015

Related U.S. Application Data

(63) Continuation of application No. 13/642,800, filed as application No. PCT/JP2011/001070 on Feb. 24, 2011, now Pat. No. 8,873,000.

(30) Foreign Application Priority Data

Apr. 30, 2010   (JP) .................................. 2010-104785

(51) Int. Cl.
*G02F 1/1333*    (2006.01)
*G02F 1/1335*    (2006.01)
*G02B 5/20*    (2006.01)
*G02B 5/22*    (2006.01)
*H05B 33/10*    (2006.01)

(52) U.S. Cl.
CPC .......... *G02F 1/133514* (2013.01); *G02B 5/201* (2013.01); *G02B 5/22* (2013.01); *G02F 1/133516* (2013.01); *H05B 33/10* (2013.01)

(58) Field of Classification Search
CPC .................................................. G02F 1/133516
See application file for complete search history.

(56) References Cited

U.S. PATENT DOCUMENTS

| 2005/0142976 A1 | 6/2005 | Suzuki |
| 2007/0217045 A1* | 9/2007 | Chen et al. ..................... 359/891 |
| 2008/0002113 A1 | 1/2008 | Abe et al. |

(Continued)

FOREIGN PATENT DOCUMENTS

| JP | 8-122803 A | 5/1996 |
| JP | 2001-183685 A | 7/2001 |

(Continued)

*Primary Examiner* — Timothy L Rude
(74) *Attorney, Agent, or Firm* — Birch, Stewart, Kolasch & Birch, LLP

(57) ABSTRACT

A color filter substrate can include a first colored layer, a second colored layer, and a third colored layer that are arranged on a transparent substrate and that have mutually different hues, and a common electrode disposed so as to cover the first colored layer, the second colored layer, and the third colored layer, wherein the common electrode includes a first transparent electrode and a second transparent electrode that are disposed to overlap the first colored layer and the second colored layer, respectively, and that are made of a first transparent conductive film; a third transparent electrode that is disposed to overlap the third colored layer, the third transparent electrode being made of a second transparent conductive film that is different from the first transparent conductive film; and a fourth transparent electrode that is disposed to overlap the first colored layer, the fourth transparent electrode being made of the second transparent conductive film.

20 Claims, 5 Drawing Sheets

(56) References Cited

U.S. PATENT DOCUMENTS

2009/0168181 A1* 7/2009 Su et al. .................. 359/586
2011/0031517 A1* 2/2011 Huang et al. ................ 257/98

FOREIGN PATENT DOCUMENTS

| JP | 2005-197010 A | 7/2005 |
|---|---|---|
| JP | 2008-9214 A | 1/2008 |

* cited by examiner (a)

(b)

(c)

(d)

(a)

(b)

(c)

(d)

(e)

(f)

COLOR FILTER SUBSTRATE, DISPLAY PANEL AND METHOD FOR PRODUCING COLOR FILTER SUBSTRATE

CROSS REFERENCE TO RELATED APPLICATIONS

This application is a continuation of copending application Ser. No. 13/642,800, filed on Oct. 22, 2012, which is the National Phase of PCT/JP2011/001070 filed on Feb. 24, 2011, which claims priority under 35 U.S.C. §119(a) to Patent Application No. 2010-104,785, filed in Japan on Apr. 30, 2010. The contents of application Ser. No. 13/642,800 are hereby incorporated by reference as fully set forth herein in their entirety.

TECHNICAL FIELD

The present invention relates to a color filter substrate, a display panel, and a method of manufacturing a color filter substrate, and more particularly, to a color filter substrate that is manufactured by a sputtering method, a display panel equipped with the same, and a method of manufacturing the color filter substrate.

BACKGROUND ART

A liquid crystal display panel includes a TFT substrate that is provided with thin film transistors (may also be referred to as "TFTs" below) and the like in respective pixels, each of which is the smallest unit of an image, a CF substrate that is disposed to face the TFT substrate and that is provided with a color filter (may also be referred to as "CF" below) and the like, and a liquid crystal layer disposed between the TFT substrate and the CF substrate, for example.

The CF substrate includes a black matrix disposed in a grid pattern on a glass substrate, a plurality of colored layers including red layers, green layers, blue layers, and the like, which are respectively formed in respective grids of the black matrix, i.e., in respective pixels, and a common electrode disposed so as to cover the black matrix and the respective colored layers, for example.

In the CF substrate having the above-mentioned configuration, a transparent conductive film that is used as the common electrode is formed by sputtering, and therefore, the film thickness of the transparent conductive film, which is integrally formed in the respective pixels each having a red layer, a green layer, or a blue layer, for example, is made uniform on the surface of the substrate. This makes it difficult to obtain desired optical characteristics for the respective colored layers of red layers, green layers, and blue layers.

Patent Document 1, for example, discloses a display device having a color filter and a manufacturing method thereof, in which the optical film thickness of the transparent conductive film is made to differ among the respective pixel colors by controlling the film thickness of the transparent conductive film by pixel color through changing the injection amount of ink in forming the transparent conductive film by applying an ink, which is obtained by dispersing particles of a transparent conductive film material into a binder, with ink-jet printing, and by thereafter baking the coating film.

RELATED ART DOCUMENT

Patent Document

Patent Document 1: Japanese Patent Application Laid-Open Publication No. 2008-9214

SUMMARY OF THE INVENTION

Problems to be Solved by the Invention

In the manufacturing method disclosed in Patent Document 1, the film thickness of the transparent conductive film can be set differently for each colored layer, which allows the respective colored layers to have desired optical characteristics. However, because it is necessary to add an ink-jet apparatus for forming the transparent conductive film to an existing manufacturing line, there is room for improvement.

The present invention was made in view of such a point, and aims at minimizing an investment in equipment and obtaining desired optical characteristics for respective colored layers.

Means for Solving the Problems

In order to achieve the above-mentioned objective, in the present invention, a common electrode is made of a plurality of transparent electrodes that are formed by using two types of transparent conductive films and that appropriately overlap a first colored layer, a second colored layer, and a third colored layer, respectively.

Specifically, a color filter substrate according to the present invention includes: a first colored layer, a second colored layer, and a third colored layer that are arranged on a transparent substrate and that have mutually different hues; and a common electrode disposed so as to cover the first colored layer, the second colored layer, and the third colored layer, wherein the common electrode includes: a first transparent electrode and a second transparent electrode that are disposed to overlap the first colored layer and the second colored layer, respectively, and that are made of a first transparent conductive film; a third transparent electrode that is disposed to overlap the third colored layer, the third transparent electrode being made of a second transparent conductive film that is different from the first transparent conductive film; and a fourth transparent electrode that is disposed to overlap the first colored layer, the fourth transparent electrode being made of the second transparent conductive film.

According to this configuration, the common electrode is made of: a laminate of the first transparent electrode, which is formed of the first transparent conductive film, and the fourth transparent electrode, which is formed of the second transparent conductive film, overlapping the first colored layer; the second transparent electrode that is formed of the first transparent conductive film and that overlaps the second colored layer; and the third transparent electrode that is formed of the second transparent conductive film and that overlaps the third colored layer. This way, the common electrode has different configurations for the respective colored layers of the first colored layer, the second colored layer, and the third colored layer, and therefore, it is possible to achieve desired optical characteristics for the respective colored layers. Also, because the first transparent conductive film and the second transparent conductive film can be formed by an existing sputtering apparatus, which is provided in a typical manufacturing line for a color filter substrate, it is possible to minimize an investment in equipment. Thus, the investment in equipment can be minimized, and desired optical characteristics can be achieved for the respective colored layers.

The fourth transparent electrode may be formed on the first transparent electrode, and the first transparent conductive film may have a higher etching resistance than that of the second transparent conductive film.

According to this configuration, the fourth transparent electrode is formed on the first transparent electrode, which means that the second transparent conductive film is formed after the first transparent conductive film is formed. The first transparent conductive film has a higher etching resistance than that of the second transparent conductive film, and therefore, when the second transparent conductive film is patterned to form the third transparent electrode and the fourth transparent electrode, the second transparent electrode made of the first transparent conductive film is unlikely to be etched. This eliminates a need to form a resist pattern on the second transparent electrode in patterning the second transparent conductive film, which makes it possible to prevent an increase in the manufacturing cost.

The first transparent conductive film may be a polycrystalline indium tin oxide film, and the second transparent conductive film may be an amorphous indium tin oxide film.

According to this configuration, because the first transparent conductive film is a polycrystalline indium tin oxide film, and the second transparent conductive film is an amorphous indium tin oxide film, the etching resistance of the first transparent conductive film can be specifically made higher than that of the second transparent conductive film.

The first transparent conductive film may be formed by annealing an amorphous indium tin oxide film.

According to this configuration, because the first transparent conductive film is formed by annealing an amorphous indium tin oxide film, the etching resistance of the first transparent conductive film can be specifically made higher.

The first transparent conductive film may be a polycrystalline indium tin oxide film, and the second transparent conductive film may be an indium zinc oxide film.

According to this configuration, because the first transparent conductive film is a polycrystalline indium tin oxide film, and the second transparent conductive film is an indium zinc oxide film, the etching resistance of the first transparent conductive film can be specifically made higher than that of the second transparent conductive film.

The first transparent conductive film may be formed by annealing an amorphous indium tin oxide film.

According to this configuration, because the first transparent conductive film is formed by annealing an amorphous indium tin oxide film, the etching resistance of the first transparent conductive film can be specifically made higher.

The first transparent conductive film and the second transparent conductive film may have mutually different film thicknesses.

According to this configuration, the first transparent conductive film and the second transparent conductive film have mutually different film thicknesses, and therefore, it is possible to achieve the desired optical characteristics for the respective colored layers not only by the material design of the transparent conductive films, but also by the film thickness design of the transparent conductive films.

A display panel according to the present invention includes: an element substrate and a color filter substrate disposed to face each other; and a display medium layer disposed between the element substrate and the color filter substrate, wherein the color filter substrate includes: a first colored layer, a second colored layer, and a third colored layer that are arranged on a transparent substrate and that have mutually different hues; and a common electrode disposed so as to cover the first colored layer, the second colored layer, and the third colored layer, and wherein the common electrode includes: a first transparent electrode and a second transparent electrode that are disposed to overlap the first colored layer and the second colored layer, respectively, and that are made of a first transparent conductive film; a third transparent electrode that is disposed to overlap the third colored layer, the third transparent electrode being made of a second transparent conductive film that is different from the first transparent conductive film; and a fourth transparent electrode that is disposed to overlap the first colored layer, the fourth transparent electrode being made of the second transparent conductive film.

According to this configuration, in the color filter substrate, the common electrode is made of: a laminate of the first transparent electrode, which is formed of the first transparent conductive film, and the fourth transparent electrode, which is formed of the second transparent conductive film, overlapping the first colored layer; the second transparent electrode that is formed of the first transparent conductive film and that overlaps the second colored layer; and the third transparent electrode that is formed of the second transparent conductive film and that overlaps the third colored layer. This way, the common electrode have different configurations in the respective colored layers of the first colored layer, the second colored layer, and the third colored layer, and therefore, it is possible to achieve desired optical characteristics for the respective colored layers. Also, because the first transparent conductive film and the second transparent conductive film can be formed by an existing sputtering apparatus, which is provided in a typical manufacturing line for a color filter substrate, it is possible to minimize an investment in equipment. Thus, in the display panel including a color filter substrate, the investment in equipment can be minimized, and desired optical characteristics can be achieved for the respective color filters.

A method of manufacturing a color filter substrate according to the present invention is a method of manufacturing a color filter substrate that includes: a first colored layer, a second colored layer, and a third colored layer that are arranged on a transparent substrate and that have mutually different hues; and a common electrode disposed so as to cover the first colored layer, the second colored layer, and the third colored layer, the method including: a colored layer forming process of forming the first colored layer, the second colored layer, and the third colored layer on the transparent substrate; a first transparent conductive film patterning process of forming a portion of the common electrode by forming a first transparent conductive film so as to cover at least the first colored layer and the second colored layer by sputtering, and by thereafter patterning the first transparent conductive film to form a first transparent electrode and a second transparent electrode that respectively overlap the first colored layer and the second colored layer; and a second transparent conductive film patterning process of forming a remaining portion of the common electrode by forming a second transparent conductive film, which is different from the first transparent conductive film, so as to cover at least the first transparent electrode and the third colored layer by sputtering, and by thereafter patterning the second transparent conductive film to form a third transparent electrode and a fourth transparent electrode that respectively overlap the third colored layer and the first transparent electrode.

According to this method, the common electrode is made of: a laminate of the first transparent electrode, which is formed of the first transparent conductive film in the first transparent conductive film patterning process, and the fourth transparent electrode, which is formed of the second transparent conductive film in the second transparent conductive film patterning process, overlapping the first colored layer; the second transparent electrode that is formed of the first transparent conductive film in the first transparent conductive film patterning process and that overlaps the second colored layer; and the third transparent electrode that is formed of the second transparent conductive film in the second transparent conductive film patterning process and that overlaps the third colored layer. This way, the common electrode have different configurations in the respective colored layers of the first colored layer, the second colored layer, and the third colored layer that were formed in the colored layer forming process, and therefore, it is possible to achieve desired optical characteristics for the respective colored layers. Also, because the first transparent conductive film and the second transparent conductive film can be formed by an existing sputtering apparatus, which is provided in a typical manufacturing line for a color filter substrate, it is possible to minimize investment in equipment. Thus, the investment in equipment can be minimized, and desired optical characteristics can be achieved for the respective colored layers.

The first transparent conductive film may have a higher etching resistance than that of the second transparent conductive film.

According to this method, the first transparent conductive film has a higher etching resistance than that of the second transparent conductive film, and therefore, in the second transparent conductive film patterning process, when the second transparent conductive film is patterned to form the third transparent electrode and the fourth transparent electrode, the second transparent electrode made of the first transparent conductive film is unlikely to be etched. This eliminates a need to form a resist pattern on the second transparent electrode in patterning the second transparent conductive film, which makes it possible to prevent an increase in the manufacturing cost.

The first transparent conductive film may be a polycrystalline indium tin oxide film, and the second transparent conductive film may be an amorphous indium tin oxide film.

According to this method, because the first transparent conductive film is a polycrystalline indium tin oxide film, and the second transparent conductive film is an amorphous indium tin oxide film, the etching resistance of the first transparent conductive film can be specifically made higher than that of the second transparent conductive film.

In the first transparent conductive film patterning process, the first transparent conductive film may be formed by forming an amorphous indium tin oxide film so as to cover at least the first colored layer and the second colored layer, and by thereafter poly-crystallizing the amorphous indium tin oxide film through annealing.

According to this method, because the first transparent conductive film is formed by poly-crystallizing the amorphous indium tin oxide film through annealing in the first transparent conductive film patterning process, the etching resistance of the first transparent conductive film can be specifically made higher.

The first transparent conductive film may be a polycrystalline indium tin oxide film, and the second transparent conductive film may be an indium zinc oxide film.

According to this method, because the first transparent conductive film is a polycrystalline indium tin oxide film, and the second transparent conductive film is an indium zinc oxide film, the etching resistance of the first transparent conductive film can be specifically made higher than that of the second transparent conductive film.

In the first transparent conductive film patterning process, the first transparent conductive film may be formed by forming an amorphous indium tin oxide film so as to cover at least the first colored layer and the second colored layer, and by thereafter poly-crystallizing the amorphous indium tin oxide film through annealing.

According to this method, because the first transparent conductive film is formed by poly-crystallizing the amorphous indium tin oxide film through annealing in the first transparent conductive film patterning process, the etching resistance of the first transparent conductive film can be specifically made higher.

The first transparent conductive film and the second transparent conductive film may have mutually different film thicknesses.

According to this method, the first transparent conductive film and the second transparent conductive film have mutually different film thicknesses, and therefore, it is possible to achieve the desired optical characteristics for the respective colored layers not only by the material design of the transparent conductive films, but also by the film thickness design of the transparent conductive films.

Effects of the Invention

According to the present invention, because the common electrode is made of a plurality of transparent electrodes that are formed by using two types of transparent conductive films and that appropriately overlap the first colored layer, the second colored layer, and the third colored layer, respectively, investment in equipment can be minimized, and the desired optical characteristics can be obtained for the respective colored layers.

DETAILED DESCRIPTION OF EMBODIMENTS

Below, an embodiment of the present invention will be explained in detail with reference to figures. The present invention is not limited to the following embodiment.

Figure 1:
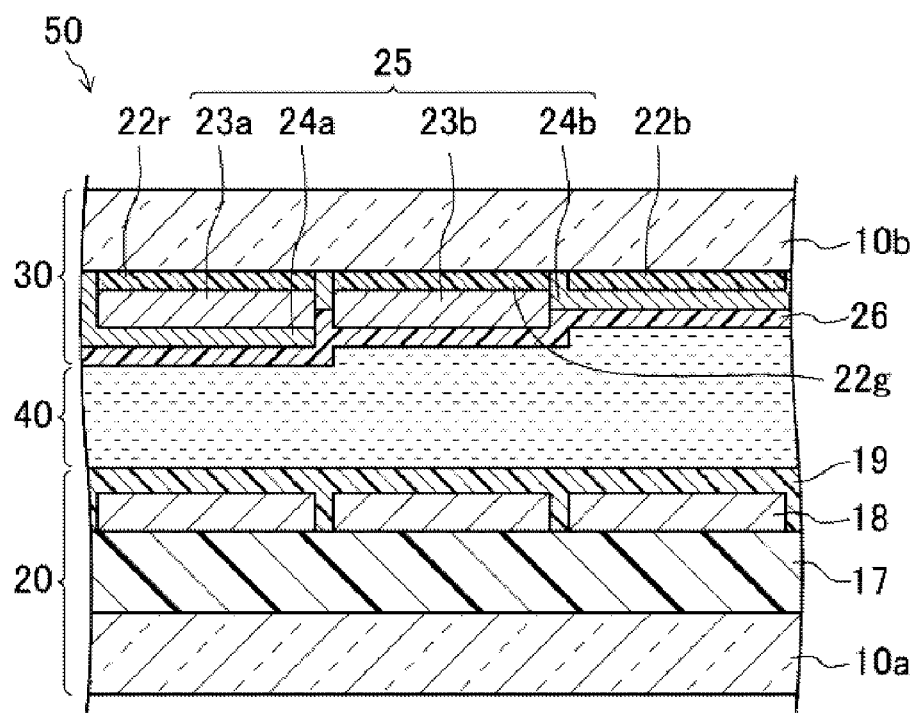
FIG. 1 is a cross-sectional view of a liquid crystal display panel equipped with a color filter substrate according to an embodiment of the present invention.
Figure 2:
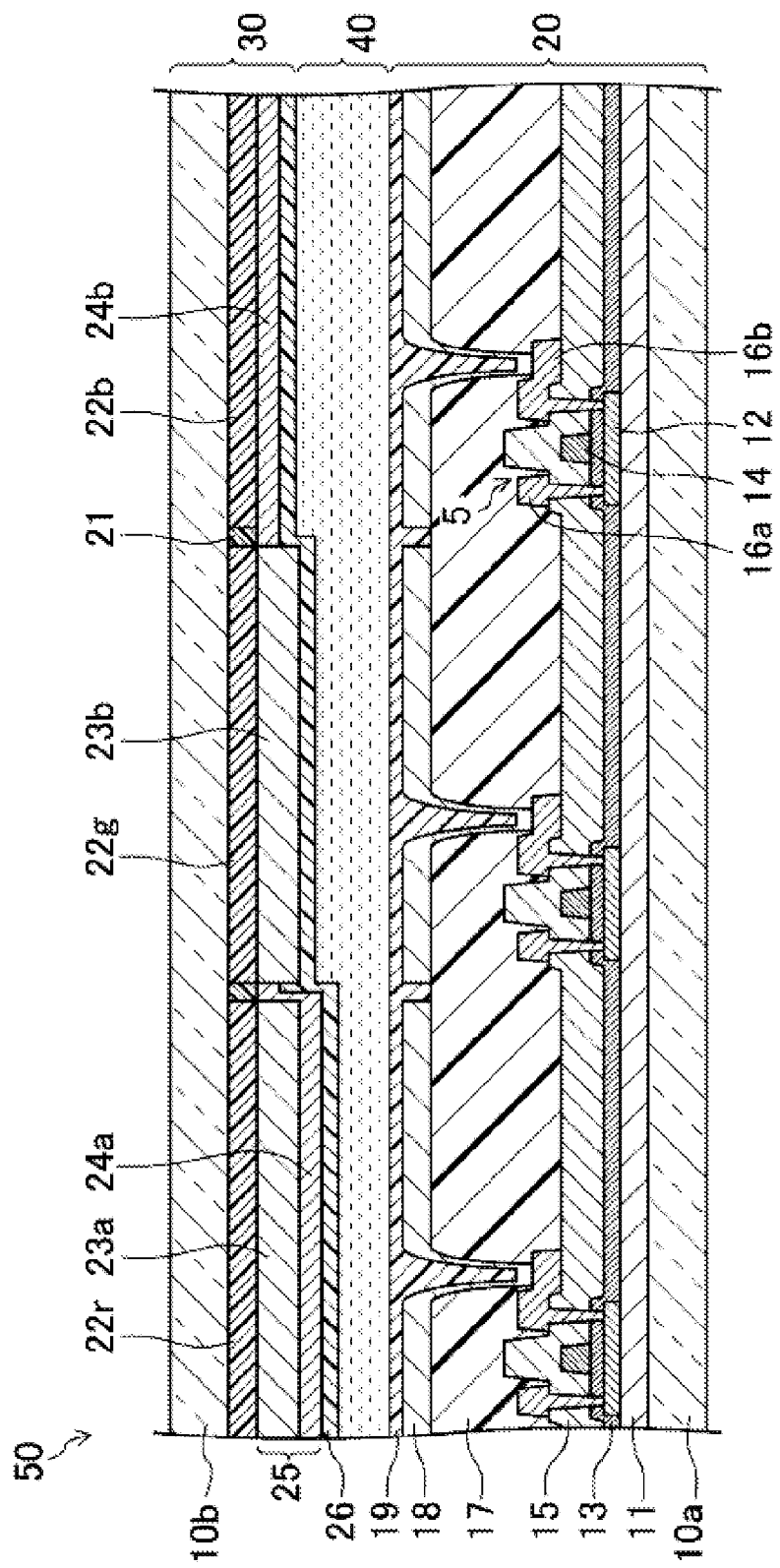
FIG. 2 is a cross-sectional view showing the liquid crystal display panel in FIG. 1 in detail.

FIGS. 1 to 5 show an embodiment of a color filter substrate, a display panel, and a method of manufacturing the color filter substrate according to the present invention. In the present embodiment, a liquid crystal display panel is described as an example of the display panel. FIG. 1 is a cross-sectional view of a liquid crystal display panel 50 equipped with a CF substrate 30 of the present embodiment. FIG. 2 is a cross-sectional view showing the liquid crystal display panel 50 in detail.

As shown in FIGS. 1 and 2, the liquid crystal display panel 50 includes a TFT substrate 20 provided as an element substrate, the CF substrate 30 disposed to face the TFT substrate 20, a liquid crystal layer 40 provided between the TFT substrate 20 and the CF substrate 30 as a display medium layer, and a sealing member (not shown) that is provided to bond the TFT substrate 20 and the CF substrate 30 to each other and that is formed in a frame shape so as to seal the liquid crystal layer 40 between the TFT substrate 20 and the CF substrate 30.

As shown in FIGS. 1 and 2, the TFT substrate 20 includes a transparent substrate 10a, a plurality of gate lines (not shown) disposed so as to extend in parallel with each other on the transparent substrate 10a, a plurality of source lines (not shown) disposed so as to extend in parallel with each other in a direction orthogonal to the respective gate lines, a plurality of TFTs 5 that are provided at respective intersections of the respective gate lines and the respective source lines, i.e., in respective pixels, an interlayer insulating film 17 disposed so as to cover the respective TFTs 5, a plurality of pixel electrodes 18 disposed in a matrix on the interlayer insulating film 17, and an alignment film 19 disposed so as to cover the respective pixel electrodes 18.

As shown in FIG. 2, the TFT 5 includes a semiconductor layer 12 disposed above the transparent substrate 10a having a base coat film 11 interposed therebetween, a gate insulating film 13 disposed so as to cover the semiconductor layer 12, a gate electrode 14 disposed on the gate insulating film 13 so as to overlap a part of the semiconductor layer 12, a protective film 15 disposed so as to cover the gate electrode 14, and a source electrode 16a and a drain electrode 16b that are disposed on the protective film 15. The semiconductor layer 12 has a channel region, a source region, and a drain region. The channel region is disposed so as to overlap the gate electrode 14, and the source and drain regions are disposed so as to face each other over the channel region.

The gate electrode 14 is a portion of each of the gate lines, which protrudes to the side, for example.

The source electrode 16a is a portion of each of the source lines, which protrudes to the side, for example. As shown in FIG. 2, the source electrode 16a is connected to the source region of the semiconductor layer 12 through a contact hole formed in the protective film 15.

As shown in FIG. 2, the drain electrode 16b is connected to the drain region of the semiconductor layer 12 through a contact hole formed in the protective film 15, and is also connected to the pixel electrode 18 through a contact hole formed in the interlayer insulating film 17.

As shown in FIGS. 1 and 2, the CF substrate 30 includes a transparent substrate 10b, a black matrix 21 disposed on the transparent substrate 10b in a grid pattern, red layers 22r, green layers 22g, and blue layers 22b, which are respectively disposed in respective grids of the black matrix 21 as first colored layers, second colored layers, and third colored layers having mutually different hues, a common electrode 25 disposed so as to cover the black matrix 21, the red layers 22r, the green layers 22g, and the blue layers 22b, and an alignment film 26 disposed so as to cover the common electrode 25. The red layers 22r, the green layers 22g, and the blue layers 22b are arranged in a matrix.

As shown in FIGS. 1 and 2, the common electrode 25 includes a first transparent electrode 23a and a fourth transparent electrode 24a that are laminated in this order on the red layer 22r so as to overlap the red layer 22r, a second transparent electrode 23b disposed on the green layer 22g so as to overlap the green layer 22g, and a third transparent electrode 24b disposed on the blue layer 22b so as to overlap the blue layer 22b.

The liquid crystal layer 40 is made of a nematic liquid crystal material having electrooptic characteristics and the like.

The liquid crystal display panel 50 having the above configuration is configured to display an image by applying prescribed voltages to the liquid crystal layer 40 between the respective pixel electrodes 18 on the TFT substrate 20 and the common electrode 25 on the CF substrate 30 pixel by pixel to change the orientation state of the liquid crystal layer 40, and by adjusting the transmittance of light that passes through the panel in each pixel.

Figure 3:
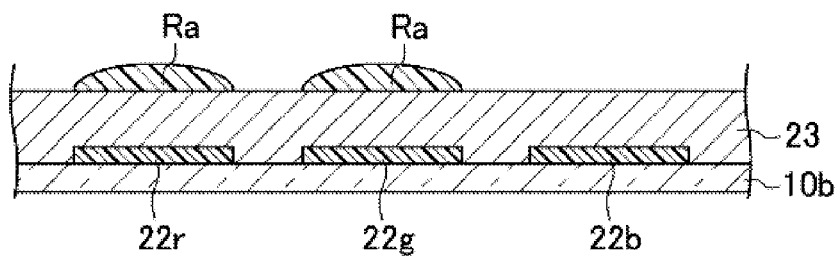
FIG. 3 is an explanatory diagram showing a method of manufacturing a color filter substrate according to an embodiment of the present invention in cross-sectional views.
Figure 3:
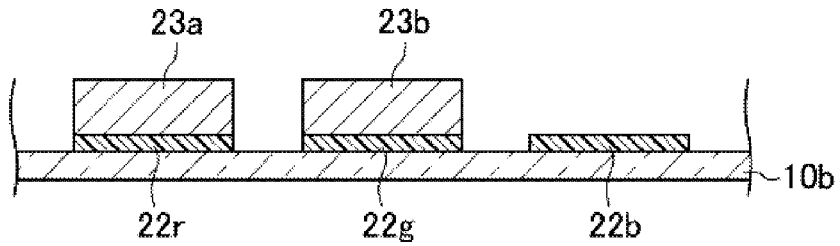
Figure 3:
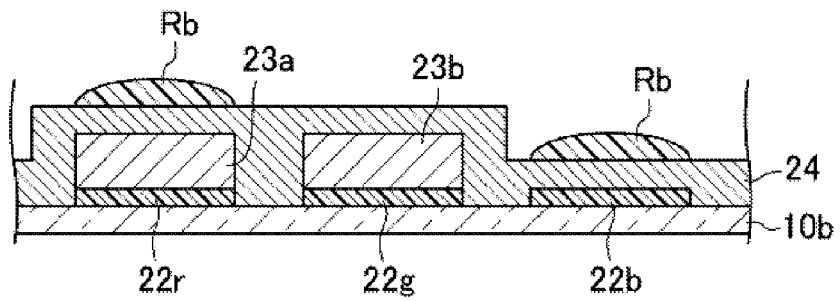
Figure 3:
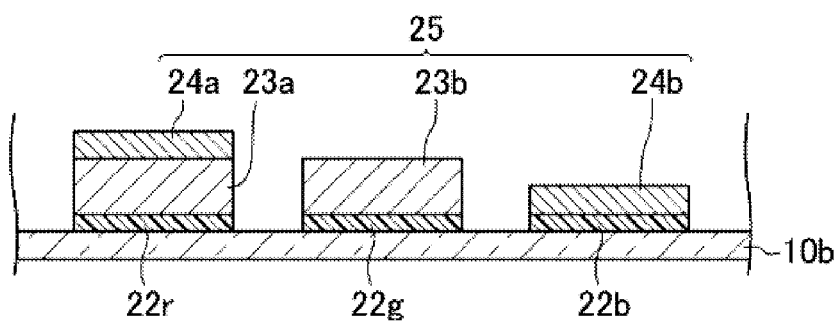

Next, a method of manufacturing the CF substrate 30 of the present embodiment will be explained with reference to FIGS. 1 to 3. FIG. 3 is an explanatory diagram showing a method of manufacturing the CF substrate 30 of the present embodiment in cross-sectional views. In FIG. 3, the black matrix 21 is not shown, and the respective transparent electrodes are schematically illustrated. The method of manufacturing the CF substrate 30 of the present embodiment includes a colored layer forming process, a first transparent conductive film patterning process, and a second transparent conductive film patterning process.

First, a black-colored photosensitive resin, for example, is applied to the transparent substrate 10b such as a glass substrate by a spin coating method or slit coating method so as to coat the entire substrate. Thereafter, the coating film undergoes exposure and development, thereby forming the black matrix 21 (see FIG. 2) in a thickness of about 1.0 µm.

Next, by a spin coating method or slit coating method, a photosensitive resin colored in red, green, or blue, for example, is applied to the entire substrate having the black matrix 21 formed thereon. Thereafter, the coating film undergoes exposure and development, thereby forming a colored layer of a selected color (red layer 22r, for example) in a thickness of about 1 µm to 3 µm. The same process is repeated for the other two colors such that colored layers of the other two colors (green layer 22g and blue layer 22b, for example) are formed in a thickness of about 1 µm to 3 µm (colored layer forming process).

Next, on the entire substrate having the red layer 22r, the green layer 22g, and the blue layer 22b formed thereon, a first transparent conductive film 23 (about 10 nm to 200 nm thick) such as a poly-ITO (Indium Tin Oxide) film, for example, is formed by sputtering. Thereafter, as shown in FIG. 3(a), a resist pattern Ra is formed on the first transparent conductive film 23 by photolithography.

Next, the first transparent conductive film 23 is patterned through steps of removing the first transparent conductive film 23 that is exposed from the resist pattern Ra by wet etching, removing the resist pattern Ra, and washing. As a result, as shown in FIG. 3(b), the first transparent electrode 23a and the second transparent electrode 23b are formed (first transparent conductive film patterning process).

Next, on the entire substrate having the first transparent electrode 23a and the second transparent electrode 23b formed thereon, a second transparent conductive film 24 (about 10 nm to 200 nm thick) such as an amorphous ITO film, for example, is formed by sputtering, and thereafter, as shown in FIG. 3(c), a resist pattern Rb is formed on the second transparent conductive film 24 by photolithography.

Next, the second transparent conductive film 24 is patterned through steps of removing the second transparent conductive film 24 that is exposed from the resist pattern Rb by wet etching, removing the resist pattern Rb, and washing. As a result, as shown in FIG. 3(d), the third transparent electrode 24b and the fourth transparent electrode 24a are formed, and the common electrode 25 made of the first transparent electrode 23a, the second transparent electrode 23b, the third transparent electrode 24b, and the fourth transparent electrode 24a is also formed (second transparent conductive film patterning process).

Lastly, on the entire substrate having the common electrode 25 formed thereon, a thin film of a polyimide resin is formed by a spin coating method, slit coating method or printing method, and alignment treatment by rubbing is performed to the surface thereof, thereby forming the alignment film 26.

In the above-mentioned manner, the CF substrate 30 of the present embodiment that includes the common electrode 25 having different thicknesses for the respective colored layers of the red layer 22r, the green layer 22g, and the blue layer 22b can be manufactured.

Figure 6:
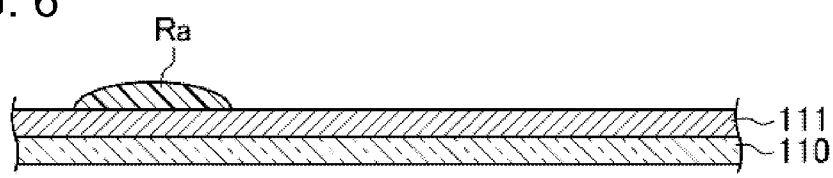
FIG. 6 is an explanatory diagram showing a method of manufacturing a color filter substrate as a comparison example of the present invention in cross-sectional views.
Figure 6:
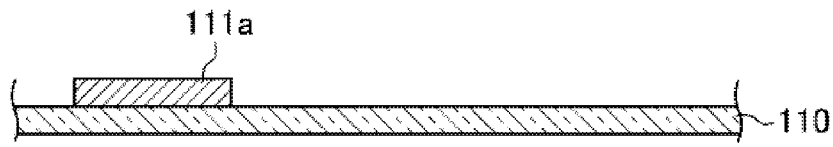
Figure 6:
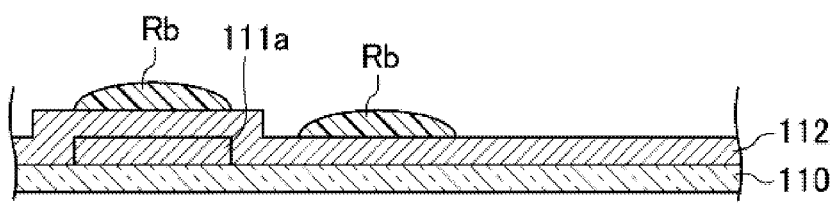
Figure 6:
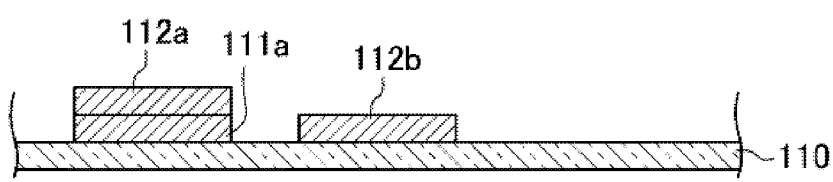
Figure 6:
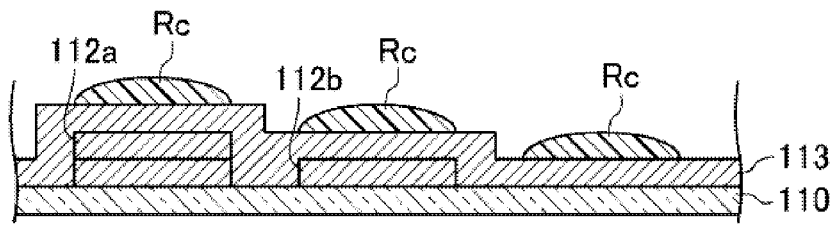
Figure 6:
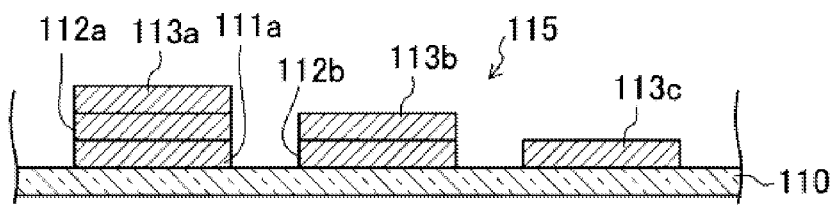

FIG. 6 is an explanatory diagram showing a method of manufacturing a CF substrate of a comparison example of the present invention in cross-sectional views. In this CF substrate, the transparent conductive films, which were formed by ink-jet printing in Patent Document 1, for example, were formed by sputtering.

In the manufacturing method of this comparison example, first, an ITO film 111 is formed by sputtering on an entire substrate 110 having a black matrix, red layers, green layers, and blue layers formed thereon. Thereafter, as shown in FIG. 6(a), a resist pattern Ra is formed on the ITO film 111 by photolithography.

Thereafter, as shown in FIG. 6(b), by removing the ITO film 111 that is exposed from the resist pattern Ra, an ITO layer 111a is formed.

Next, on the entire substrate having the ITO layer 111a formed thereon, an ITO film 112 is formed by sputtering. Thereafter, as shown in FIG. 6(c), a resist pattern Rb is formed on the ITO film 112 by photolithography.

Thereafter, as shown in FIG. 6(d), by removing the ITO film 112 that is exposed from the resist pattern Rb, ITO layers 112a and 112b are formed.

Next, on the entire substrate having the ITO layers 112a and 112b formed thereon, an ITO film 113 is formed by sputtering. Thereafter, as shown in FIG. 6(e), a resist pattern Rc is formed on the ITO film 113 by photolithography.

Thereafter, as shown in FIG. 6(f), by removing the ITO film 113 that is exposed from the resist pattern Rc, ITO layers 113a, 113b, and 113c are formed.

In the manufacturing method of this comparison example, a common electrode 115 that has a first film thickness of the three-layered laminate in which the ITO layers 111a, 112a, and 113a are laminated, a second film thickness of the two-layered laminate in which the ITO layers 112b and 113b are laminated, and a third film thickness of a single-layer body of the ITO layer 113c can be formed, however, it requires three photography steps. In contrast, in the manufacturing method of the present embodiment, two types of transparent conductive films 23 and 24 that have mutually different etching characteristics, i.e., the second transparent conductive film 24 and the first transparent conductive film 23 having a higher etching resistance than that of the second transparent conductive film 24, are used, and therefore, it is possible to form the common electrode 25 having three different thicknesses with two photolithography steps.

In the present embodiment, the combination of a poly-ITO film (polycrystalline indium tin oxide film) and an amorphous ITO film (amorphous indium tin oxide film) was described as examples of the first transparent conductive film 23 and the second transparent conductive film 24. However, it is also possible to use a combination of a poly-ITO film, which is obtained by annealing an amorphous ITO film, and an amorphous ITO film, a combination of a poly-ITO film and an IZO (Indium Zinc Oxide) film, a combination of a poly-ITO film, which is obtained by annealing an amorphous ITO film, and an IZO film, or the like.

Figure 4:
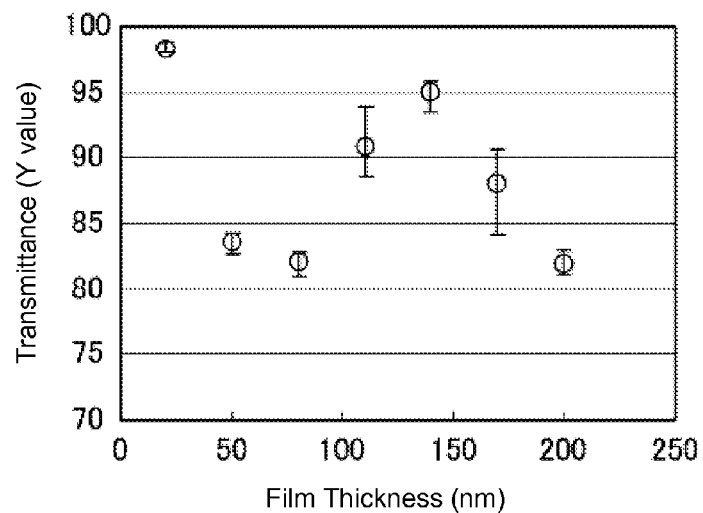
FIG. 4 is a graph showing a relationship between the film thickness and the transmittance of transparent conductive films that were obtained in a study according to an embodiment of the present invention.
Figure 5:
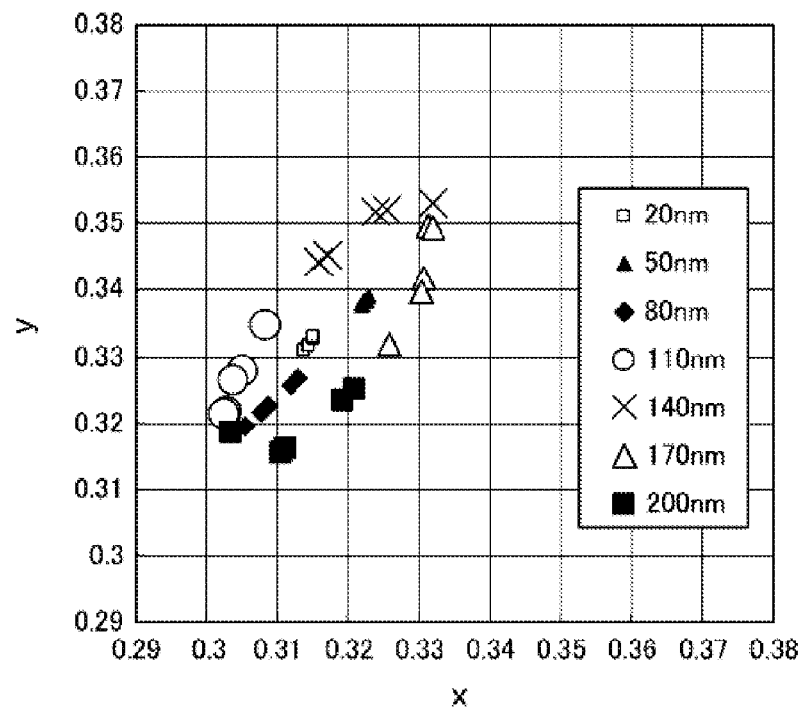
FIG. 5 is a chromaticity diagram showing a relationship between the film thickness and the chromaticity of the transparent conductive films that were obtained in the study according to an embodiment of the present invention.

Below, a specific study that was conducted will be explained with reference to FIGS. 4 and 5. FIG. 4 is a graph showing a relationship between the film thickness and the transmittance of transparent conductive films obtained in the study of the present embodiment. FIG. 5 is a CIE 1931 color space chromaticity diagram that shows a relationship between the film thickness and the chromaticity of the transparent conductive films. In FIG. 4, "○" represents the average value of the transmittance data, and a pair of "-" connected by a vertical line represents the maximum value and the minimum value of the transmittance data.

Specifically, in this study, IZO films having different thicknesses (20 nm, 50 nm, 80 nm, 110 nm, 140 nm, 170 nm, and 200 nm) were formed on a grass substrate by sputtering, and five samples of the transmittance (Y value) and the chromaticity (x, y) of each IZO film formed in the above-mentioned manner were obtained through measurement using a microspectrophotometer (OLYMPUS Corp., OSP-SP200).

As shown in FIGS. 4 and 5, it was verified that the transmittance (Y value) and the chromaticity (x, y) changed as a result of changing the film thickness of the IZO film. Therefore, it can be said that, by appropriately laminating transparent electrodes, each of which is made of the first transparent conductive film or the second transparent conductive film, in the respective colored layers to make the film thicknesses of the common electrode differ from each other among respective colored layers, as in the present embodiment, the desired optical characteristics for the respective colored layers can be obtained.

As described above, according to the CF substrate 30, the liquid crystal display panel 50, and the method of manufacturing the CF substrate 30 of the present embodiment, the common electrode is made of: a laminate of the first transparent electrode 23a, which is formed of the first transparent conductive film 23 in the first transparent conductive film patterning process, and the fourth transparent electrode 24a, which is formed of the second transparent conductive film 24 in the second transparent conductive film patterning process, overlapping the red layer 22r; the second transparent electrode 23b that is formed of the first transparent conductive film 23 in the first transparent conductive film patterning process and that overlaps the green layer 22g;and the third transparent electrode 24b that is formed of the second transparent conductive film 24 in the second transparent conductive film patterning process and that overlaps the blue layer 22b. This way, the common electrode 25 has different configurations in the respective colored layers of the red layer 22r, the green layer 22g, and the blue layer 22b that were formed in the colored layer forming process, and therefore, it is possible to achieve desired optical characteristics for the respective colored layers. Also, because the first transparent conductive film 23 and the second transparent conductive film 24 can be formed by an existing sputtering apparatus, which is provided in a typical manufacturing line for a CF substrate, it is possible to minimize investment in equipment. Thus, in the CF substrate 30, the investment in equipment can be minimized, and desired optical characteristics can be achieved for the respective colored layers.

According to the CF substrate 30, the liquid crystal display panel 50, and the method of manufacturing the CF substrate 30 of the present embodiment, the first transparent conductive film 23 has a higher etching resistance than that of the second transparent conductive film 24, and therefore, in the second transparent conductive film patterning process, when the second transparent conductive film 24 is patterned to form the third transparent electrode 24b and the fourth transparent electrode 24a, the second transparent electrode 23b made of the first transparent conductive film 23 is unlikely to be etched. This eliminates a need to form a resist pattern on the second transparent electrode 23b in patterning the second transparent conductive film 24, which makes it possible to prevent an increase in the manufacturing cost.

According to the CF substrate 30, the liquid crystal display panel 50, and the method of manufacturing the CF substrate 30 of the present embodiment, the first transparent conductive film 23 and the second transparent conductive film 24 have mutually different film thicknesses, and therefore, it is possible to achieve the desired optical characteristics for the respective colored layers not only by the material design of the transparent conductive films, but also by the film thickness design of the transparent conductive films.

In the present embodiment, the configuration in which the common electrode 25 is relatively thicker in a portion thereof that overlaps the red layer 22r, and is relatively thinner in a portion thereof that overlaps the blue layer 22b was described as an example, but the present invention is not limited to this configuration (combination of film thicknesses).

In the present embodiment, the CF substrate having a stripe arrangement pattern was described as an example, but the present invention can also be applied to a CF substrate having a delta arrangement pattern, a mosaic arrangement pattern, or the like.

In the present embodiment, the CF substrate having the colored layers of three colors, which are the first colored layer, the second colored layer, and the third colored layer, arranged therein was described as an example. However, the present invention can also be applied to a CF substrate having colored layers of four or more colors arranged therein by using three types of transparent conductive films, for example.

In the present embodiment, the CF substrate having the first colored layer, the second colored layer, and the third colored layer disposed therein was described as an example, but the present invention can also be applied to a TFT substrate having a CF on array structure, in which the first colored layer, the second colored layer, and the third colored layer are provided in the TFT substrate.

In the present embodiment, the liquid crystal display panel was described as an example of the display panel, but the present invention can also be applied to other display panels such as an organic EL (Electro Luminescence) panel.

Industrial Applicability

As described above, with the CF substrate of the present invention, investment in equipment can be minimized, and the desired optical characteristics can be obtained for the respective colored layers. Thus, the present invention can be effectively used for a liquid crystal display panel, an organic EL panel, or the like.

DESCRIPTIONS OF REFERENCE CHARACTERS 10b transparent substrate
20 TFT substrate (element substrate)
22b blue layer (third colored layer)
22g green layer (second colored layer)
22r red layer (first colored layer)
23 first transparent conductive film
23a first transparent electrode
23b second transparent electrode
24 second transparent conductive film
24a fourth transparent electrode
24b third transparent electrode
25 common electrode
30 CF substrate
40 liquid crystal layer (display medium layer)
50 liquid crystal display panel

The invention claimed is:

1. An organic-light-emitting diode display panel, comprising:
an element substrate and a color filter substrate disposed to face each other; and
an organic electroluminescent display layer disposed between the element substrate and the color filter substrate,
wherein the color filter substrate comprises:
a first colored layer, a second colored layer, and a third colored layer that are arranged on a transparent substrate and that have mutually different hues; and
an electrode layer disposed so as to cover the first colored layer, the second colored layer, and the third colored layer, and
wherein the electrode layer comprises:
a first transparent electrode and a second transparent electrode that are disposed to overlap the first colored layer and the second colored layer, respectively, and that are made of a first transparent conductive film;
a third transparent electrode that is disposed to overlap the third colored layer, the third transparent electrode being made of a second transparent conductive film that is different from the first transparent conductive film; and
a fourth transparent electrode that is disposed to overlap the first colored layer, the fourth transparent electrode being made of the second transparent conductive film.

2. The display panel according to claim 1, wherein the fourth transparent electrode is formed on the first transparent electrode, and wherein the first transparent conductive film has a higher etching resistance than that of the second transparent conductive film.

3. The display panel according to claim 1, wherein the first transparent conductive film is a polycrystalline indium tin oxide film, and wherein the second transparent conductive film is an amorphous indium tin oxide film.

4. The display panel according to claim 1, wherein the first transparent conductive film is a polycrystalline indium tin oxide film, and wherein the second transparent conductive film is an indium zinc oxide film.

5. The display panel according to claim 1, wherein the first transparent conductive film and the second transparent conductive film have mutually different film thicknesses.

6. The display panel according to claim 1, wherein the color filter substrate further comprises a fourth colored layer that has mutually different hues from the first colored layer, the second colored layer and the third colored layer.

7. The display panel according to claim 1, wherein the electrode layer has different thicknesses at the first colored layer, at the second colored layer and at the third colored layer.

8. A display panel, comprising:
a first colored layer, a second colored layer, and a third colored layer that are arranged on a substrate and that have mutually different hues;
an array of thin-film-transistors on the substrate; and
an electrode layer disposed so as to cover the first colored layer, the second colored layer, and the third colored layer,
wherein the electrode layer comprises:
a first transparent electrode and a second transparent electrode that are disposed to overlap the first colored layer and the second colored layer, respectively, and that are made of a first transparent conductive film;
a third transparent electrode that is disposed to overlap the third colored layer, the third transparent electrode being made of a second transparent conductive film that is different from the first transparent conductive film; and
a fourth transparent electrode that is disposed to overlap the first colored layer, the fourth transparent electrode being made of the second transparent conductive film.

9. The display panel according to claim 8, further comprising a liquid crystal layer.

10. The display panel according to claim 8, further comprising an organic EL layer.

11. The display panel according to claim 8, further comprising a fourth colored layer arranged on the substrate, the fourth colored layer having a different hue from the first colored layer, the second colored layer and the third colored layer.

12. The display panel according to claim 8, wherein the fourth transparent electrode is formed on the first transparent electrode, and wherein the first transparent conductive film has a higher etching resistance than that of the second transparent conductive film.

13. The display panel according to claim 8, wherein the first transparent conductive film is a polycrystalline indium tin oxide film, and wherein the second transparent conductive film is an amorphous indium tin oxide film.

14. The display panel according to claim 8, wherein the first transparent conductive film is a polycrystalline indium tin oxide film, and wherein the second transparent conductive film is an indium zinc oxide film.

15. The display panel according to claim 8, wherein a thickness of the electrode layer is different at the first colored layer, at the second colored layer and at the third colored layer.

16. A display panel comprising:
a substrate;
a first colored layer, a second colored layer, and a third colored layer provided on the substrate;
a first transparent electrode disposed to overlap the first colored layer;
a second transparent electrode disposed to overlap the second colored layer;
a third transparent electrode disposed to overlap the third colored layer; and
a fourth transparent electrode disposed to overlap the first colored layer,
wherein the first transparent electrode and the second transparent electrode are made of a first transparent conductive film, the third transparent electrode and the fourth transparent electrode are made of a second transparent conductive film, and the second transparent conductive film is different from the first transparent conductive film.

17. The display panel according to claim 16, further comprising an array of thin film transistors on the substrate.

18. The display panel according to claim 16, further comprising an organic EL layer.

19. The display panel according to claim 16, further comprising at least one colored layer provided on the substrate.

20. The display panel according to claim 19 further comprising a third transparent conductive film overlapped with the at least one colored layer.

* * * * *